Jan. 16, 1962 E. O. WITT 3,017,075

PUNCH APPARATUS

Filed Oct. 12, 1959 5 Sheets-Sheet 1

Jan. 16, 1962
E. O. WITT
PUNCH APPARATUS
3,017,075
Filed Oct. 12, 1959
5 Sheets-Sheet 2
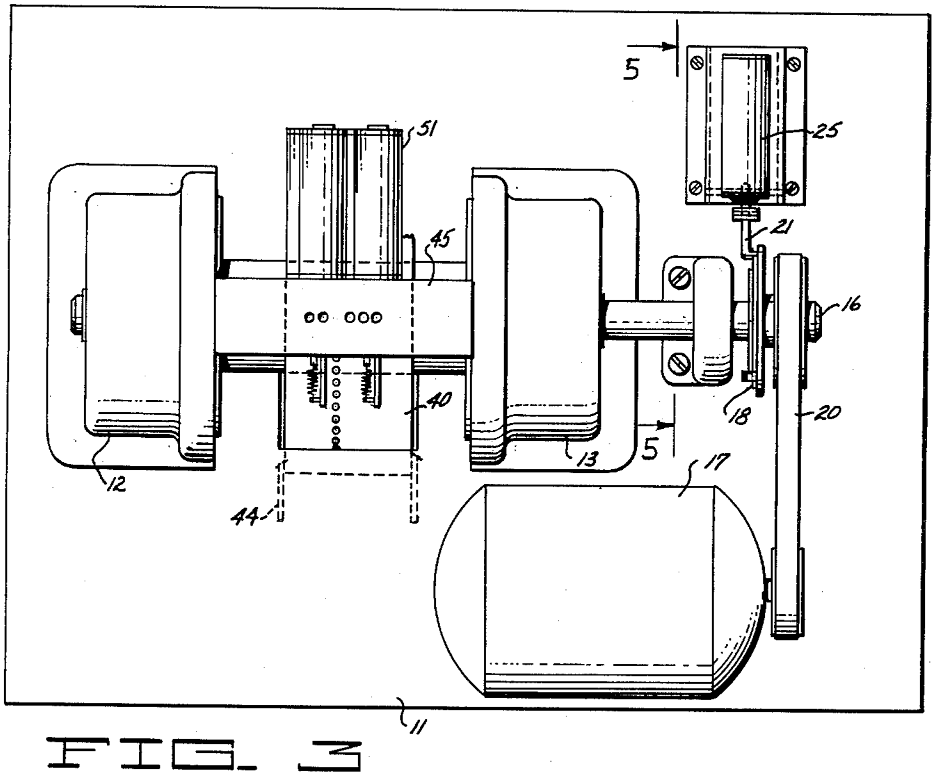
FIG. 3
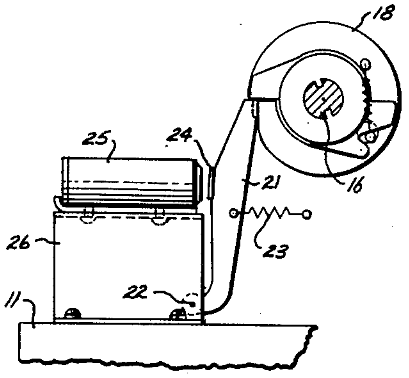
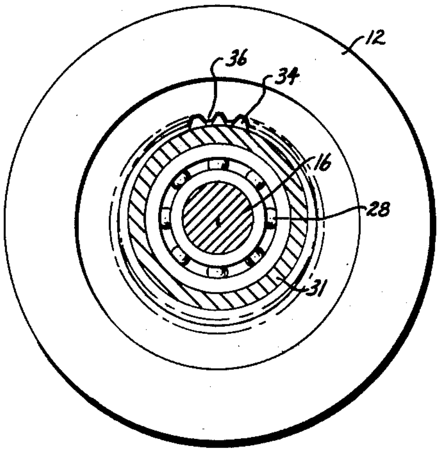
FIG. 5 FIG. 4

Jan. 16, 1962 E. O. WITT 3,017,075

PUNCH APPARATUS

Filed Oct. 12, 1959 5 Sheets-Sheet 3

Jan. 16, 1962 E. O. WITT 3,017,075

PUNCH APPARATUS

Filed Oct. 12, 1959 5 Sheets-Sheet 4

Jan. 16, 1962 E. O. WITT 3,017,075
PUNCH APPARATUS
Filed Oct. 12, 1959 5 Sheets-Sheet 5

3,017,075

PUNCH APPARATUS

Elwin O. Witt, Sierra Madre, Calif., assignor to Clary Corporation, San Gabriel, Calif., a corporation of California Filed Oct. 12, 1959, Ser. No. 845,679
5 Claims. (Cl. 234—39)

This invention relates to apparatus for perforating record material, such as paper tape, to represent different data in coded form.

In general, data of the above type is represented along the tape or other record material by patterns of different combinations of perforations extending across the width of the tape. Each combinational pattern across the tape represents a patricular numeral, alphabetical character or the like.

A principal object of the present invention is to provide a high speed data punch.

Another object is to reduce wear on the die openings of a perforating data punch.

Another object is to effect punching and feeding of a punched tape by the same punching element or unit.

Another object is to cause punches for perforating sprocket feed holes in a tape to also effect proper feeding of the tape.

A further object is to provide a tape punch which is economical to manufacture and yet which is reliable at relatively high speeds.

The manner in which the above and other objects of the invention are accomplished will be readily understood on reference to the following specification when read in conjunction with the accompanying drawings, wherein:

FIG. 3 is a plan view of the punch apparatus.

FIG. 4 is a transverse sectional view taken substantially along the line 4—4 of FIG. 1.

FIG. 5 is a sectional view taken along the line 5—5 of FIG. 3, illustrating the punch clutch and its controls.

Figure 1:
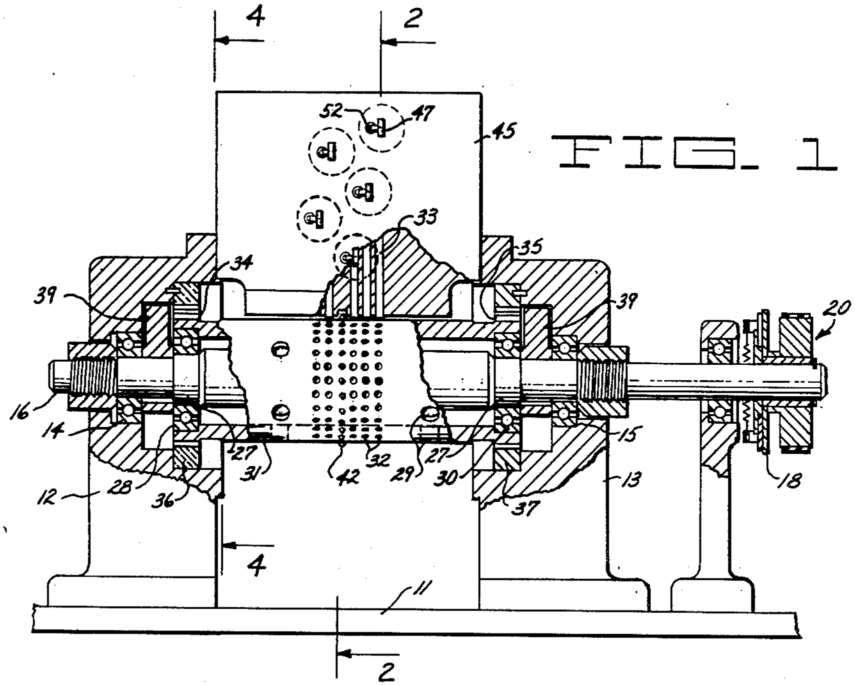
FIG. 1 is a front elevation view of a tape punch apparatus embodying a preferred form of the present invention.

Referring particularly to FIGS. 1 to 5, inclusive, the punch apparatus illustrated therein comprises a horizontally extending base 11 on which are fixed a pair of spaced bearing brackets 12 and 13 which house ball bearings 14 and 15, respectively. The latter rotatably support a drive shaft 16.

The shaft 16 is driven by an electric motor 17 through a one-revolution clutch 18 of conventional construction. The driving side of the latter is suitably keyed to the shaft 16 and the driven side thereof is coupled through a belt and pulley connection 20 to the motor.

The motor 17 is continuously operated and the clutch 18 is normally held in its illustrated disengaged condition by a clutch dog 21 (FIG. 5) which is pivotally supported at 22 and urged into clutch disengaging condition by a tension spring 23. An ear 24 on the clutch dog 21 forms an armature which cooperates with an electromagnet 25 supported from the base 11 by a bracket 26. Upon energization of the electromagnet the clutch dog 21 will be drawn counterclockwise to enable engagement of the clutch 18.

Eccentric sections 27 formed on the shaft 16 support the inner races of ball-bearings 28 and 30, whose outer races support a hollow die cylinder or drum 31. The die cylinder surrounds the shaft 16 eccentrically thereof without touching the same.

The die cylinder 31 has a series of adjacent circumferentially extending rows of die openings 32 spaced therearound to cooperate with a series of punches 33. Such die openings are frusto-conical in shape as shown particularly in the enlarged sectional views of FIGS. 9 and 12. Enlarged openings 29 are also formed in the die cylinder on opposite sides of the die openings 32 to permit the punched chad to drop through the cylinder and onto the base.

Counter weights 39 are fastened to the shaft 16 intermediate the sets of bearings 14, 28 and 15, 30 to balance the eccentrically located drum 31, etc.

External gears 34 and 35 are formed on the opposite ends of the cylinder 31 concentrically thereof, and these mesh with internal gears 36 and 37, suitably secured in the brackets 12 and 13, respectively. The latter internal gears are arranged concentrically of the shaft 16 and its bearings.

Figure 9:
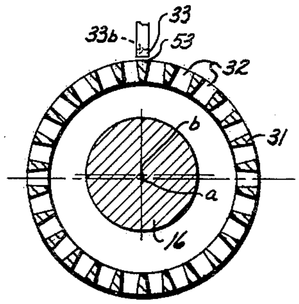
FIG. 9 is an enlarged sectional view through the die cylinder or drum of FIG. 1.

As shown in FIG. 9, each row of die openings around the die cylinder, includes in this embodiment, twenty-six equally spaced die openings. Accordingly, each of the external gears 34 and 35 is provided with twice such number or fifty-two teeth which mesh with fifty-four teeth in the mating internal gears. In other words, the ratio of the pitch diameters of the external and internal gears is twenty-six to twenty-seven. Thus, upon each complete rotation of the shaft 16 and consequent orbital movement of the type cylinder about the center of shaft 16, the cylinder will advance $\frac{1}{27}$ of a revolution or from one group of die openings to the next around the cylinder relative to an aligned set of data punches 33.

Figures 1A, 2:
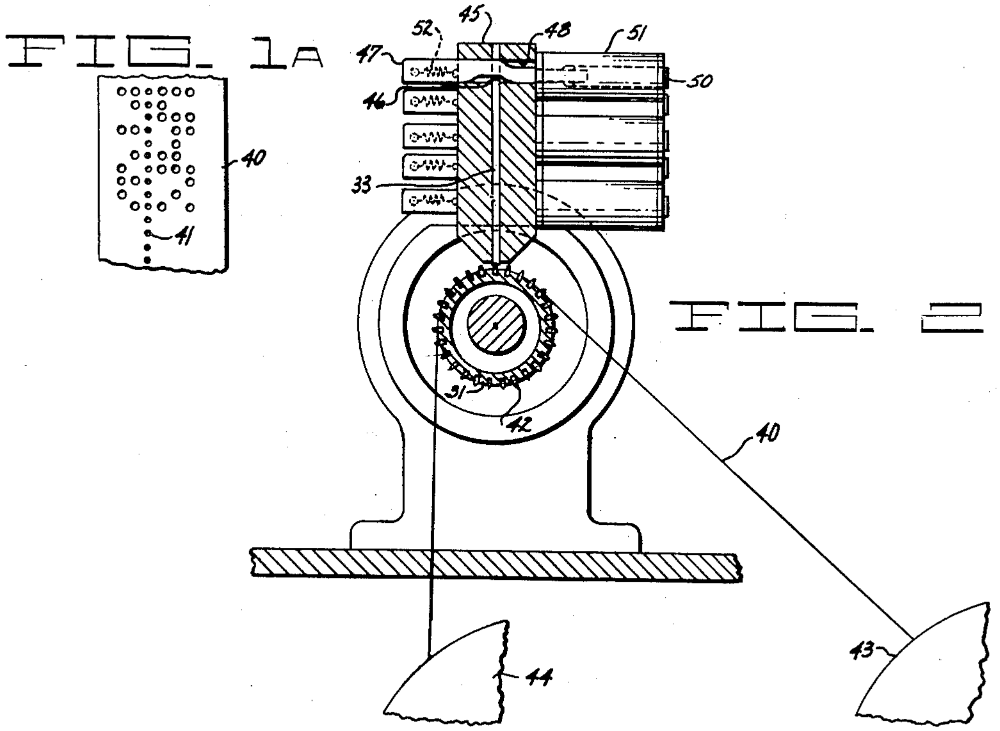
FIG. 1A is a fragmentary view of a tape perforated by the punch apparatus of the present invention.
FIG. 2 is a transverse sectional view through the punch apparatus and is taken substantially along the line 2—2 of FIG. 1.

Five data punches 33 are provided for punching a five channel data code in a tape 40, FIG. 1A. The tape is provided with feed sprocket perforations 41 which are fed over sprocket teeth 42 formed around the die cylinder 31. Obviously, more or less data punches and aligned rows of openings could be provided to accommodate codes having different numbers of channels or code units.

The tape is fed from a supply reel 43, over the die cylinder 31 and onto a take up reel 44, means (not shown) being provided for yieldably driving the take up reel in time with rotation of the cylinder 31.

The data punches 33 are aligned with each other in a direction parallel to the axis of the die cylinder 31 and are guided for endwise movement toward and away from the drum in a guide block 45 which is suitably secured at its opposite ends to the bearing brackets 12 and 13.

Each punch 33 is provided with an edge notch 46 which receives a cam bar 47 (FIG. 2) slidably mounted for endwise movement in a slot 48 in the block 45. Each cam bar 47 is attached to the armature 50 of a solenoid coil 51 which is suitably attached to the block 45. When the solenoid is de-energized a spring 52, tensioned between the block and a pin on the cam bar 47, holds the respective cam bar in its right-hand illustrated position wherein it maintains the associated punch 33 in an upper position wherein its lower end extends slightly above the periphery of the die cylinder 31 and the tape 40.

It wll be noted on reference to FIG. 1, in particular, that the punches 33 are spaced relatively close together, and in order to provide sufficient room for the various solenoids 51, the various cam bars 47 are staggered vertically relative to each other.

Normally, when the clutch 18 is disengaged, the cylinder 31 is located with its axis *a* (FIG. 9) located below the axis *b* of the shaft 16 and internal gears 36 and 37 so that its upper periphery extends a maximum distance below the lower edges of the punches 33. Also, at this time each of the punches 33 is located directly over a land 53 extending between two adjacent die openings 32. If, at this time, a solenoid 51 is energized, its associated punch 33 will be lowered from its dotted line position 33*b* of FIG. 9 to its full line position, in which case the lower edge of the punch will be spaced only slightly above the periphery of the die cylinder.

Figure 12:
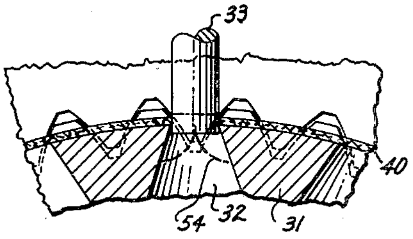
FIG. 12 is an enlarged fragmentary view through the die cylinder, illustrating one of the data punches cooperable therewith.

Referring particularly to FIGS. 9 and 12, when the clutch 18 is engaged, the die cylinder 31 will move in an orbit about the axis *b* of the shaft 16 and internal gears 36 and 37, causing the center of each die opening 33 to describe a hypocycloidal curve as indicated at 54. During such movement the die cylinder will force the tape 40 against the bottom edges of the lowered punch or punches 33, causing the same to perforate the tape. The resulting chad will drop into the interior of the cylinder. The conical shapes of the die openings 32 permit a slight relative rocking movement of the cylinder relative to the punches 33 during the perforating operation and also provide clearance for the chad.

As the clutch continues to the end of its cycle of operation the die cylinder 31 recedes from the punches and comes to rest in the position shown in FIG. 9. Suitable stripping means (not shown) may be provided to ensure stripping of the tape from the lowered punches.

Figures 6, 7:
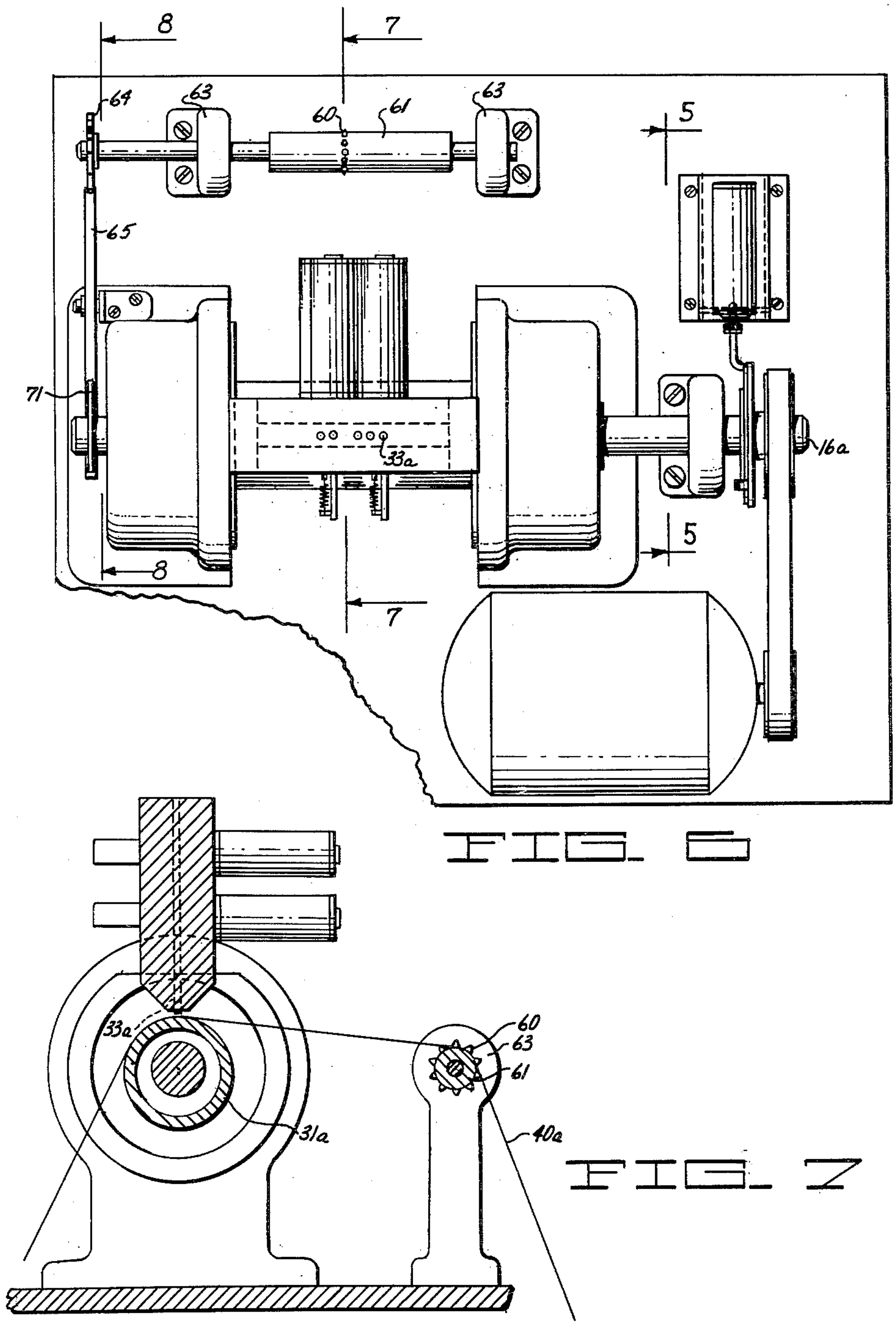
FIG. 6 is a plan view, partly broken away, illustrating a modified form of punch apparatus.
FIG. 7 is a transverse sectional view taken substantially along the line 7—7 of FIG. 6.
Figure 8:
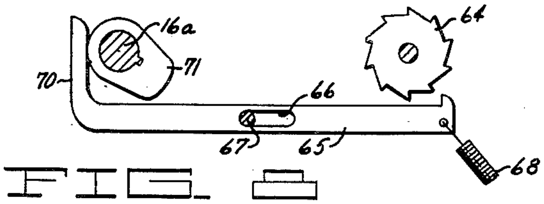
FIG. 8 is a sectional view taken along the line 8—8 of FIG. 6, illustrating the tape advancing mechanism.

FIGS. 6, 7, and 8 illustrate a modified form of punch apparatus in which the sprocket teeth 42 of FIGS. 1 and 2 are emitted from the die cylinder and instead separate feed teeth 60 are formed on a feed roller 61 for the purpose of advancing the tape over the die cylinder. In this construction, elements similar to those shown in FIGS. 1 to 5 are identified by similar reference numerals followed by the sub-script *a*.

The tape 40*a*, similar to the tape 40 of FIG. 1A, is passed over the roll 61 and the die cylinder 31*a* whereby the feed roll is effective to pull the tape over the die cylinder in timed relation thereto. It should be understood that, in this case, the tape is drawn from left to right.

For the purpose of advancing the roll 61, the latter is journaled in bearings 62 and 63 and has a ratchet wheel 64 attached thereto. The latter is engageable by a pawl 65 having a slot 66 guided over a stationary pin 67. A tension spring 68 normally holds the pawl in its position illustrated in FIG. 8 with a foot 70 thereof in engagement with a cam 71 keyed to the punch drive shaft 16*a*. Thus, before a punching operation, the cam 71 will first engage the pawl with the ratchet wheel and will thereafter cause the pawl to advance the tape to a new punch line relative to the punches 33*a*.

Figure 10:
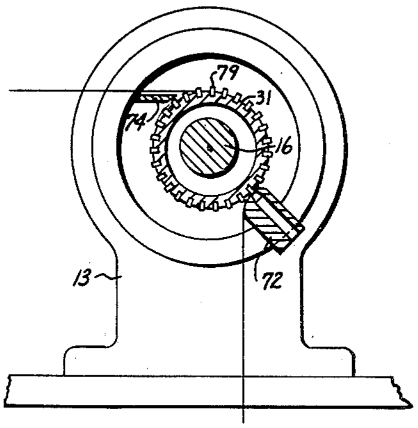
FIG. 10 is a transverse sectional view similar to FIG. 2 but illustrating a modified form of the invention for punching feed sprocket perforations along the length of a tape.
Figure 11:
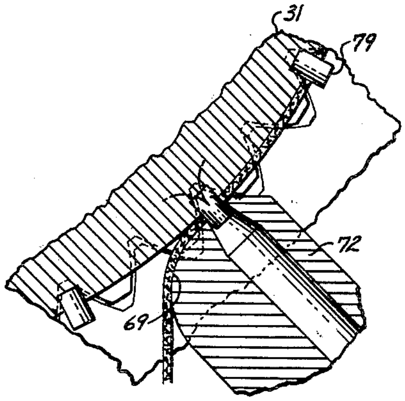
FIG. 11 is an enlarged fragmentary sectional view illustrating the die shown in FIG. 10 and certain of the punches associated therewith.

FIGS. 10 and 11 illustrate a modified form of the invention applicable to the construction shown in FIGS. 1 to 5 for perforating the feed holes, i.e., 41 (FIG. 1A), during operation of the punch. In this construction, the feed pins 42 of FIG. 1 are replaced by a plurality of feed hole punches 79. The latter are suitably embedded in the die cylinder 31 and are spaced apart distances equal to the spacing between adjacent die openings around the cylinder. The punches 79 cooperate with a single stationary die 72 attached between the bearing brackets, i.e., 13.

In this case, the tape is wrapped around approximately 180° of the periphery of the die cylinder and extends between the same and the die 72. The die 72 has a curved guideway 69 formed thereon to guide the tape from a vertical path onto the periphery of the die cylinder.

As the die cylinder 31 is moved in an orbit around the axis of the shaft 16, the punches 79 successively perforate the tape upon entering the die and thereafter become effective to advance the tape over the die cylinder and past the data punches.

A stationary stripper plate 74 engages the tape to remove the same from the punches 79 after passing the data punches.

The feed hole punch arrangement, shown in FIGS. 10 and 11, could also be set up as a unit in itself, for preparing the tape for any form of code punching apparatus.

Figure 13:
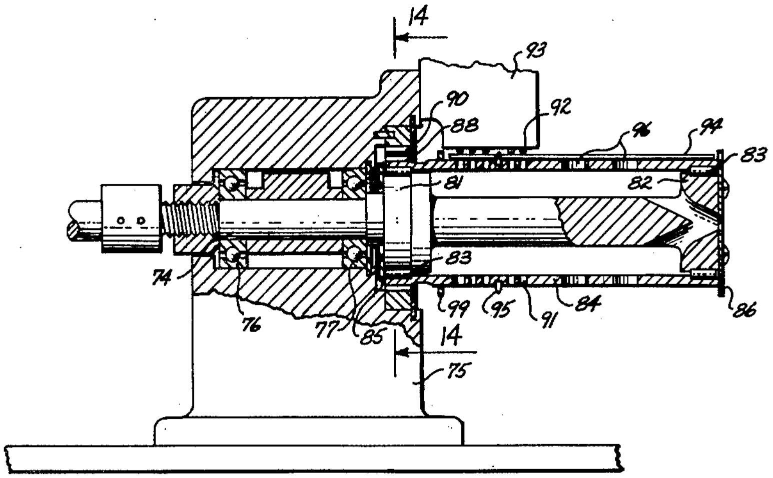
FIG. 13 is a sectional view through a further modified form of punch apparatus particularly suitable for punching coded representations along the edge of a card or sheet of record material.
Figure 14:
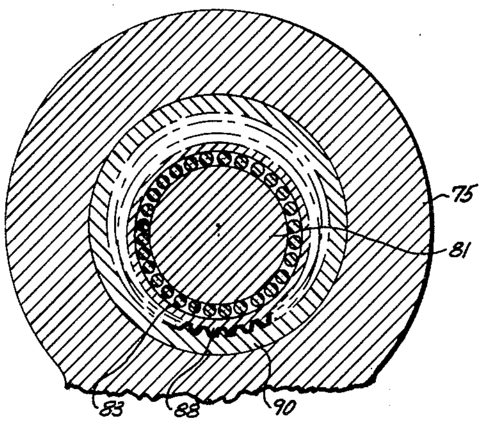
FIG. 14 is an enlarged transverse sectional view taken substantially along the line 14—14 of FIG. 13.

FIGS. 13 and 14 illustrate a modified form of the invention which is particularly applicable to code perforating along the length of a card or other sheet regardless of the width thereof.

In this case, a drive shaft 74 is rotatably supported in a bearing housing 75 by ball bearings 76 and 77. The shaft is driven in a manner similar to the shaft 16 illustrated in FIGS. 1 to 5 and has two bearing sections 81 and 82 whose co-extensive axes extend eccentric to the axis of rotation of the shaft 74. These bearing sections 81 and 82 form the inner races for two groups of roller bearing elements 83. The latter rotatably support the opposite ends of a die cylinder 84. Retainer rings 85 and 86 suitably attached to the shaft 74 prevent longitudinal movement of the die cylinder relative to the shaft.

An external gear 88 is formed at the left-hand end of the cylinder 84 and meshes with an internal gear 90 suitably secured to the bearing housing 75. The internal gear is located coaxially of the shaft 74 and the relationship between the gears 88 and 90 is similar to that described heretofore in connection with the gears of FIG. 1 so that as the shaft 74 is rotated groups of die openings 91 aligned parallel to the length of the cylinder 84 are successively brought into registry with a group of punches 92. The latter are slideably supported in a guide block 93 which is secured to the bearing housing 75 and are set in cooperable relation to the die cylinder in a manner similar to that disclosed in connection with the punches 33 of FIGS. 1 to 5.

A card or sheet 94 having a row of feed perforations extending adjacent the left-hand thereof is fed over the periphery of the die cylinder by sprocket teeth 95 extending in spaced relation around the latter. The card 94 may also be edge guided between the retainer ring 86 and a flange 99 formed on the die cylinder.

During each cycle or complete revolution of the cylinder, the card is raised and is caused to be perforated by any one or more of the punches 92 which have been previously lowered as described heretofore in connection with FIGS. 9 and 12.

In order to remove the chad resulting from perforating the card, enlarged openings 96 are formed on the cylinder to the right of the die openings 91. Also, the right-hand end of the shaft is formed with converging openings so that the chad may be expelled axially of the shaft 74 in the event the punch apparatus is mounted in a position wherein the shaft 74 extends vertically.

Although the invention is described in detail and therefore certain terms and languages have been used herein, it is to be understood that the present specification is illustrative rather than restrictive, and that changes and modifications may be made without departing from the spirit or scope of the invention as set forth in the claims appended hereto.

Having thus described the invention what is desired to be secured by United States Letters Patent is:

1. Apparatus for perforating a record medium or the like comprising a drum having a plurality of punches spaced therearound, means for oscillating the center of said drum while rotating said drum about said center, said last mentioned means advancing said drum from one of said punches to another during each oscillation, a stationary die having a die opening aligned with said punches, said drum being effective to advance and retract a punch in said die opening during each oscillation of said drum whereby to form perforations in said record medium, said punches remaining in engagement with said perforations after forming said perforations whereby to advance said record medium.

2. Apparatus for perforating tape or the like comprising a drum having a plurality of punches spaced therearound and extending radially therefrom, means for oscillating the center of said drum while rotating said drum about said center, said last mentioned means advancing said drum from one of said punches to another during each oscillation, a stationary die having a die opening aligned with said punches, said drum being effective to advance and retract a punch in said die opening during each oscillation, and means for guiding a tape around a portion of the periphery of said drum whereby said punches advance said tape.

3. Apparatus for perforating a record medium comprising a cylindrical drum having a plurality of die openings and a plurality of combined tape feed teeth and punches spaced therearound, a stationary internal gear, an external gear integral with said drum and having a pitch diameter smaller than the pitch diameter of said internal gear, means for moving the center of said drum in an orbit about the center of said internal gear whereby to maintain said gears in mesh, the ratio of the diameters of said external gear and said internal gear being such that said drum will advance from one of said die openings to another during each orbital movement of said drum, a stationary die having a die opening aligned with said feed punches, said drum being effective to advance and retract one of said feed punches in said stationary die opening during each orbital movement, a data punch, and means for normally maintaining said data punch away from the periphery of said drum and for selectively positioning said data punch in the path of one of said die openings.

4. Apparatus for perforating tape and the like comprising a rotatable drive shaft, means for rotatably supporting said shaft, a hollow cylindrical drum, means rotatably supporting said drum adjacent opposite ends thereof on said shaft for movement about an axis eccentric to the axis of said shaft, external gears on said drum arranged coaxially of said drum and adjacent opposite ends thereof, stationary internal gears arranged coaxially of said shaft and meshing with said external gears, said drum having die opening spaced therearound, the ratio of the diameter of said external gear and said internal gear being such that said drum will be advanced from one of said die openings to the next adjacent die opening during each revolution of said shaft, a punch cooperable with said die openings, said drum having at least one opening therein for conveying punched chad from the interior thereof, and means for normally maintaining said punch away from the periphery of said drum and for selectively positioning said punch in the path of said die openings.

5. Apparatus for perforating a record medium comprising a cylindrical drum having a plurality of die openings and a plurality of combined tape feed teeth and punches spaced therearound, a stationary internal gear, an external gear integral with said drum and having a pitch diameter smaller than the pitch diameter of said internal gear, means for moving the center of said drum in an orbit about the center of said internal gear whereby to maintain said gears in mesh, the ratio of the diameters of said external gear and said internal gear being such that said drum will advance from one of said die openings to another during each orbital movement of said drum, a stationary die having a die opening aligned with said feed punches, said drum being effective to advance and retract one of said feed punches in said stationary die opening during each said orbital movement, means for guiding said record medium over a portion of the outer periphery of said drum whereby to cause a plurality of said feed punches to engage perforations formed in said record medium by said feed punches in said die, and means for normally maintaining said data punch away from the periphery of said drum and for selectively positioning said data punch in the path of one of said die openings.

References Cited in the file of this patent

UNITED STATES PATENTS

| | | |
|---|---|---|
| 2,761,509 | Marshall et al. | Sept. 4, 1956 |
| 2,857,969 | Johnston | Oct. 28, 1958 |